US008848693B2

(12) United States Patent
Sylvain

(10) Patent No.: US 8,848,693 B2
(45) Date of Patent: Sep. 30, 2014

(54) AUTOMATED ATTENDANT MULTIMEDIA SESSION

(75) Inventor: Dany Sylvain, Gatineau (CA)

(73) Assignee: Rockstar Consortium US LP, Plano, TX (US)

(*) Notice: Subject to any disclaimer, the term of this patent is extended or adjusted under 35 U.S.C. 154(b) by 135 days.

(21) Appl. No.: 13/047,362

(22) Filed: Mar. 14, 2011

(65) Prior Publication Data
US 2011/0164611 A1  Jul. 7, 2011

Related U.S. Application Data

(63) Continuation of application No. 10/262,288, filed on Oct. 1, 2002, now Pat. No. 7,920,546.

(51) Int. Cl.
H04L 12/66 (2006.01)
H04M 7/00 (2006.01)
H04M 3/493 (2006.01)

(52) U.S. Cl.
CPC .......... *H04M 7/0027* (2013.01); *H04M 3/4938* (2013.01)
USPC .......................................... 370/352; 370/401

(58) Field of Classification Search
None
See application file for complete search history.

(56) References Cited

U.S. PATENT DOCUMENTS

| 5,454,032 | A | 9/1995 | Pinard et al. |
|---|---|---|---|
| 5,539,884 | A | 7/1996 | Robrock, II |
| 5,604,737 | A | 2/1997 | Iwami et al. |
| 5,689,553 | A | 11/1997 | Ahuja et al. |
| 5,764,750 | A | 6/1998 | Chau et al. |
| 5,790,798 | A | 8/1998 | Beckett, II et al. |
| 5,809,128 | A | 9/1998 | McMullin |
| 5,825,862 | A * | 10/1998 | Voit et al. ................. 379/142.16 |
| 5,881,145 | A | 3/1999 | Giuhat et al. |
| 5,884,032 | A | 3/1999 | Bateman et al. |
| 5,912,952 | A | 6/1999 | Brendzel |
| 5,946,386 | A | 8/1999 | Rogers et al. |
| 5,987,102 | A | 11/1999 | Elliott et al. |
| 6,011,843 | A | 1/2000 | Hochman et al. |
| 6,058,435 | A | 5/2000 | Sassin et al. |
| 6,061,347 | A | 5/2000 | Hollatz et al. |

(Continued)

FOREIGN PATENT DOCUMENTS

EP   0453128 A2   10/1991
EP   0 721 266 A2   10/1996

(Continued)

OTHER PUBLICATIONS

International Search Report and Written Opinion for PCT/IB03/04269.

(Continued)

*Primary Examiner* — Phirin Sam
(74) *Attorney, Agent, or Firm* — Withrow & Terranova, PLLC

(57) ABSTRACT

An automated attendant system is made multimedia capable by adding a combined user agent to the automated attendant. A search is done to verify that the caller to the automated attendant has combined user agent capabilities. If so, the caller receives multimedia content from the automated attendant's combined user agent so that the content may be presented on the caller's computer to assist the caller in navigating through the automated attendant's menus and options. Upon selection of a desired connection from the menus and options, the automated attendant's combined user agent helps the caller be connected by voice to the selected connection.

10 Claims, 6 Drawing Sheets

(56) References Cited

U.S. PATENT DOCUMENTS

| | | | |
|---|---|---|---|
| 6,137,869 | A | 10/2000 | Voit et al. |
| 6,196,846 | B1 | 3/2001 | Berger et al. |
| 6,215,865 | B1 | 4/2001 | McCalmont |
| 6,289,010 | B1 | 9/2001 | Voit et al. |
| 6,295,293 | B1 | 9/2001 | Tonnby et al. |
| 6,320,857 | B1 | 11/2001 | Tonnby et al. |
| 6,373,817 | B1 | 4/2002 | Kung et al. |
| 6,404,746 | B1 | 6/2002 | Cave et al. |
| 6,430,174 | B1 | 8/2002 | Jennings et al. |
| 6,442,268 | B1 | 8/2002 | Klaghofer et al. |
| 6,449,260 | B1 | 9/2002 | Sassin et al. |
| 6,453,034 | B1 | 9/2002 | Donovan et al. |
| 6,459,787 | B2 | 10/2002 | McIllwaine et al. |
| 6,512,818 | B1 | 1/2003 | Donovan et al. |
| 6,515,996 | B1 | 2/2003 | Tonnby et al. |
| 6,539,077 | B1 | 3/2003 | Ranalli et al. |
| 6,584,093 | B1 | 6/2003 | Salama et al. |
| 6,594,254 | B1 | 7/2003 | Kelly |
| 6,594,357 | B1 | 7/2003 | Emerson et al. |
| 6,597,687 | B1 | 7/2003 | Rao |
| 6,600,819 | B1 | 7/2003 | Catley et al. |
| 6,614,781 | B1 | 9/2003 | Elliott et al. |
| 6,615,236 | B2 | 9/2003 | Donovan et al. |
| 6,625,141 | B1 | 9/2003 | Glitho et al. |
| 6,690,407 | B1 | 2/2004 | Parker et al. |
| 6,693,662 | B1 | 2/2004 | Parker et al. |
| 6,697,478 | B1 | 2/2004 | Meldrum et al. |
| 6,724,887 | B1 | 4/2004 | Eilbacher et al. |
| 6,747,970 | B1 | 6/2004 | Lamb et al. |
| 6,754,693 | B1 | 6/2004 | Roberts et al. |
| 6,760,429 | B1 | 7/2004 | Hung et al. |
| 6,768,722 | B1 | 7/2004 | Katseff et al. |
| 6,771,639 | B1 | 8/2004 | Holden |
| 6,775,269 | B1 | 8/2004 | Kaczmarczyk et al. |
| 6,778,653 | B1 | 8/2004 | Kallas et al. |
| 6,822,957 | B1 | 11/2004 | Schuster et al. |
| 6,831,675 | B2 | 12/2004 | Shachar et al. |
| 6,865,681 | B2 | 3/2005 | Nuutinen |
| 6,870,848 | B1 | 3/2005 | Prokop et al. |
| 6,914,897 | B1 | 7/2005 | Schuster et al. |
| 6,934,279 | B1 | 8/2005 | Sollee et al. |
| 6,937,699 | B1 | 8/2005 | Schuster et al. |
| 6,954,524 | B2 * | 10/2005 | Gibson .............. 379/211.02 |
| 6,981,022 | B2 | 12/2005 | Boundy |
| 7,006,455 | B1 * | 2/2006 | Fandrianto et al. ......... 370/260 |
| 7,076,045 | B2 * | 7/2006 | Gibson .............. 379/211.02 |
| 7,110,525 | B1 | 9/2006 | Heller et al. |
| 7,123,700 | B1 | 10/2006 | Weaver, III et al. |
| 7,139,263 | B2 | 11/2006 | Miller et al. |
| 7,184,526 | B1 | 2/2007 | Cook |
| 7,197,560 | B2 | 3/2007 | Caslin et al. |
| 7,218,722 | B1 | 5/2007 | Turner et al. |
| 7,233,980 | B1 * | 6/2007 | Holden et al. ............ 709/219 |
| 7,245,941 | B2 * | 7/2007 | Scott ...................... 455/566 |
| 7,317,787 | B2 * | 1/2008 | Crockett et al. .......... 379/88.03 |
| 7,496,946 | B1 * | 2/2009 | Wehmeyer et al. ........... 725/59 |
| 7,593,355 | B1 * | 9/2009 | Surazski et al. ........... 370/261 |
| 7,912,193 | B2 * | 3/2011 | Chingon et al. ........ 379/142.08 |
| 8,374,319 | B1 * | 2/2013 | Bridges et al. ........... 379/88.22 |
| 2002/0075881 | A1 | 6/2002 | Yoakum et al. |
| 2002/0086665 | A1 * | 7/2002 | Maggenti et al. ........... 455/416 |
| 2002/0118675 | A1 | 8/2002 | Strathmeyer et al. |
| 2002/0124100 | A1 * | 9/2002 | Adams .................... 709/232 |
| 2002/0176404 | A1 | 11/2002 | Girard |
| 2003/0039241 | A1 * | 2/2003 | Park et al. ................. 370/352 |
| 2003/0043787 | A1 * | 3/2003 | Emerson, III ............. 370/352 |
| 2003/0063590 | A1 | 4/2003 | Mohan et al. |
| 2003/0076815 | A1 | 4/2003 | Miller et al. |
| 2003/0076819 | A1 | 4/2003 | Emerson, III |
| 2003/0126205 | A1 | 7/2003 | Lurie |
| 2003/0185232 | A1 | 10/2003 | Moore et al. |
| 2003/0214958 | A1 | 11/2003 | Madour et al. |
| 2004/0001501 | A1 | 1/2004 | Delveaux et al. |
| 2004/0008666 | A1 * | 1/2004 | Hardjono ................. 370/352 |
| 2007/0110043 | A1 | 5/2007 | Girard |

FOREIGN PATENT DOCUMENTS

| | | |
|---|---|---|
| EP | 0 999 712 A2 | 10/2000 |
| EP | 1 091548 A2 | 4/2001 |
| EP | 1148688 A1 | 10/2001 |
| WO | 98/44703 A1 | 10/1998 |
| WO | 01/15423 A1 | 3/2001 |
| WO | 01/69883 A2 | 9/2001 |
| WO | 02/11411 A1 | 2/2002 |

OTHER PUBLICATIONS

Thom, Gary A., "H.323: The Multimedia Communications Standard for Local Area Networks," IEEE Communications Magazine, vol. 34, No. 12, Dec. 1996, pp. 52-56, XP 000636454.

Anonymous: "H.245: Control Protocol for Multimedia Communication," Paragraph 5.2, May 1999, http://www.ihserc.com. 2 pages.

International Search Report and Written Opinion for PCT/IB02/04939 mailed Mar. 18, 2003. 8 pages.

International Search Report and Written Opinion for PCT/IB03/04263 mailed Feb. 16, 2004. 7 pages.

International Search Report and Written Opinion for PCT/IB03/04276 mailed Jan. 21, 2004. 7 pages.

McGoogan, Judith R. et al., "Evolution of Switching Architecture to Support Voice Telephony over ATM," Apr.-Jun. 2000, Bell Labs Technical Journal, vol. 5, issue 2, pp. 157-168.

Byte.com, http://www.byte.com/art/9801/sec5/art24.htm, Dec. 11, 2007, 3 pages.

Non-Final Office Action mailed Mar. 1, 2007, issued by the Patent Office during prosecution of U.S. Appl. No. 10/262,022. Attached as Appendix A, 9 pages.

Non-Final Office Action mailed Sep. 13, 2007, issued by the Patent Office during prosecution of U.S. Appl. No. 10/262,022. Attached as Appendix B, 10 pages.

Final Office Action mailed Mar. 4, 2008, issued by the Patent Office during prosecution of U.S. Appl. No. 10/262,022. Attached as Appendix C, 14 pages.

Non-Final Office Action mailed Sep. 16, 2008, issued by the Patent Office during prosecution of U.S. Appl. No. 10/262,022. Attached as Appendix D, 17 pages.

Non-Final Office Action mailed Mar. 4, 2009, issued by the Patent Office during prosecution of U.S. Appl. No. 10/262,022. Attached as Appendix E, 16 pages.

Notice of Allowance mailed Sep. 17, 2009, issued by the Patent Office during prosecution of U.S. Appl. No. 10/262,022. Attached as Appendix F, 16 pages.

Non-Final Office Action mailed Aug. 14, 2007, issued by the Patent Office during prosecution of U.S. Appl. No. 10/262,288. Attached as Appendix G, 15 pages.

Non-Final Office Action mailed Jan. 24, 2008, issued by the Patent Office during prosecution of U.S. Appl. No. 10/262,288. Attached as Appendix H, 10 pages.

Non-Final Office Action mailed Jul. 18, 2008, issued by the Patent Office during prosecution of U.S. Appl. No. 10/262,288. Attached as Appendix I, 16 pages.

Non-Final Office Action mailed Jan. 22, 2009, issued by the Patent Office during prosecution of U.S. Appl. No. 10/262,288. Attached as Appendix J, 13 pages.

Non-Final Office Action mailed Nov. 17, 2009, issued by the Patent Office during prosecution of U.S. Appl. No. 10/262,288. Attached as Appendix K, 18 pages.

Final Office Action mailed Jun. 2, 2010, issued by the Patent Office during prosecution of U.S. Appl. No. 10/262,288. Attached as Appendix L, 21 pages.

Notice 21 of Allowance mailed Dec. 2, 2010, issued by the Patent Office during prosecution of U.S. Appl. No. 10/262,288. Attached as Appendix M, 9 pages.

Office Action for European Application No. 02788278.6, mailed Mar. 18, 2013, 6 Pages.

European Search Report for European Application No. 12196336.7, mailed Mar. 25, 2013, 7 pages.

* cited by examiner

AUTOMATED ATTENDANT MULTIMEDIA SESSION

CROSS-REFERENCE TO RELATED APPLICATION

The present application is a continuation of U.S. patent application Ser. No. 10/262,288, filed on Oct. 1, 2002, the disclosure of which is hereby incorporated by reference in its entirety.

FIELD OF THE INVENTION

The present invention provides for multimedia sessions between a caller and an automated attendant.

BACKGROUND OF THE INVENTION

Traditional telephony services provided by digital switches, such as digital multiplexing switches, have reached their functional limits with existing user interfaces, which essentially are telephone sets having limited displays and simple keypads. Further, the telephone sets have limited bandwidth. Over newer packet networks, multimedia services are flourishing and are capable of exploiting the capabilities of advanced user terminals, desktop computers, and network appliances.

Currently, the vast majority of voice telephony is provided, at least in part, by traditional circuit-switched networks. Given the extensive infrastructure, reliability, and quality of service, the traditional telephony systems are likely to remain a significant part of communications for the foreseeable future. Unfortunately, there has been difficulty integrating voice sessions over the traditional telephony network with multimedia sessions over packet networks. Users prefer the traditional telephony network for voice, yet the voice network is unacceptable for facilitating advanced multimedia services, such as screen sharing and video conferencing.

The difficulties of integrating voice and multimedia sessions have, to some extent, been solved in commonly owned U.S. patent application Ser. No. 10/028,510, filed 20 Dec. 2001, which is hereby incorporated by reference in its entirety. The applications to which this solution may be put are myriad. For example, many telecommunication service users are frustrated with automated attendants. In particular, a user may place a call and have the call answered by seemingly countless menus and prompts before they can talk to a real person. Thus, there is a need for an option that allows a user to use the multimedia capabilities of their communications equipment to help facilitate the navigation of automated attendants.

SUMMARY OF THE INVENTION

The present invention provides a solution to the needs described above by using a combined user agent to establish a multimedia session between a caller and a called entity that uses an automated response system. In particular, a caller that has multimedia capabilities and uses a combined user agent makes a call to a called entity and passes an indication that the caller has this capability.

The called entity, which also has multimedia capabilities and the use of a combined user agent, learns that the caller has multimedia capabilities and initiates a multimedia session with the caller relating to the automated response system. The caller's computer is used to present the multimedia information to the caller, and the caller may interact with the multimedia information to learn more about selections and options in the automated response system. As the caller navigates through the multimedia information, the caller may be presented the option to select an extension relating to particular portions of the multimedia content. Upon selecting an extension, the caller's telephone may be connected to that extension for a conversation with a real person rather than the automated response system. If the person associated with the extension is not available, the caller may be routed to a voice mail system.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The functionality of the present invention relies, in its preferred embodiment, on the previously incorporated '510 patent application for some of its functionality. It should be appreciated that other techniques of facilitating the same functionality are also possible, but that for the purposes of explanation, the present invention will use the elements of the '510 application, which explained an efficient unification of parallel voice and multimedia sessions, wherein the voice session takes place in part over a traditional circuit-switched telephony network. A call signaling agent is created to control packet-based multimedia sessions, as well as to control call signaling at a traditional telephony switch, for a telephone and an associated multimedia device, such as a computer. The multi-functional call processing agent, typically referred to as a combined user agent (CUA), can effectively establish multimedia sessions with the multimedia device and voice calls with the telephone.

The present invention uses the combined call set up and handling procedures to enable callers to receive multimedia content from a called entity that has an automated response system and interact therewith. Once the user has made a selection, the voice portion of the combined call is connected to the selected extension.

Figure 1:
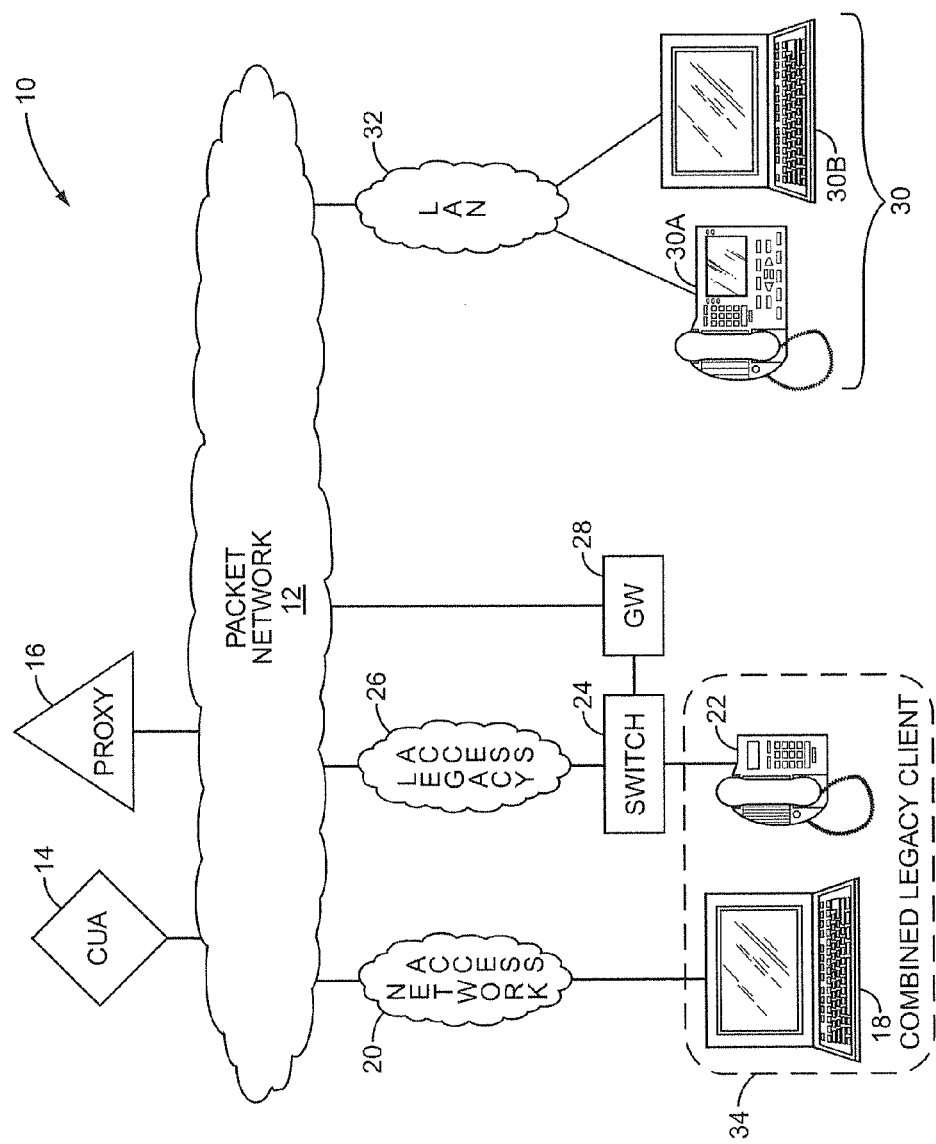
FIG. 1 is a communication environment adapted to support the present invention.

For the purposes of a full explanation, the details of a combined user agent and its operation are set forth herein. For more detail, the interested reader is directed to the previously incorporated '510 application. With reference to FIG. 1, a communication environment 10 according to the teachings of the '510 application is illustrated. The communication environment 10 may include a packet network 12 including a CUA 14 and a supporting proxy 16. The CUA 14 acts as a virtual agent for a computing device, such as a computer 18, which is capable of supporting multimedia sessions. The computer 18 may connect to the packet network 12 via a network access 20, which may include a local area network (LAN), frame relay, digital subscriber line, cable, or other such methods.

The CUA 14 also acts as an agent for a traditional telephony device, such as a telephone 22, which is supported by a telephony switch 24, such as a DMS-100 central office switch sold by Nortel Networks Limited of 2351 Boulevard Alfred-Nobel, St. Laurent, Quebec, Canada, H4S 2A9 or a public branch exchange (PBX), that is capable of providing circuit-switched communications between the telephone 22 and other telephony devices. To allow the CUA 14 to interact with and control the telephony switch 24, legacy access 26 is provided between the packet network 12 and the telephony switch 24. The legacy access 26 may be provided by existing intelligent networks (IN), including the advanced intelligent network (AIN), session initiation protocol for telephones (SIP-T) capable networks, TAPI networks, and the like, that provide access to telephony switches 24 to facilitate call signaling. The CUA 14 is configured to establish multimedia sessions over network access 20 with the computer 18 as well as provide call signaling for the telephone 22 through the telephony switch 24 via the legacy access 26.

The present invention is preferably implemented using the session initiation protocol, commonly referred to as SIP, although other standards and protocols could be used without departing from the scope of the present invention. The specification for SIP is provided in the Internet Engineering Task Force's Request for Comments (RFC) 3261: Session Initiation Protocol Internet Draft, which is hereby incorporated by reference in its entirety. In general, SIP is used to establish media sessions between any number of endpoints. Typically, these endpoints may support any number or combination of data, audio, and voice media sessions, depending on the configuration of the device. A SIP endpoint is capable of running an application, typically referred to as a user agent (UA), which is capable of facilitating media sessions using SIP. In certain embodiments, user agents may register their ability to establish sessions with a SIP proxy by sending "REGISTER" messages to the SIP proxy. The REGISTER message informs the SIP proxy of the SIP universal resource locator (URL) that identifies the user agent to the SIP network. The REGISTER message also contains information about how to reach specific user agents over the SIP network, typically by providing the Internet Protocol (IP) address and port that the user agent will use for SIP sessions. When a user agent wants to establish a session with another user agent, the user agent initiating the session may send an INVITE message to the SIP proxy and specify the target user agent in the TO header of the INVITE message. Identification of the user agent takes the form of a SIP URL. The SIP proxy will use the SIP URL in the TO header of the message to determine if the targeted user agent is registered with the SIP proxy. Generally, the user name is unique within the name space of the specified domain.

If the targeted user agent has registered with the SIP proxy, the SIP proxy will forward the INVITE message directly to the targeted user agent. The targeted user agent will respond with a 200 OK message, and a session between the respective user agents will be established as per the message exchange required in the SIP specification. Media capabilities may be exchanged in other messages, such as the SIP "INFO" message. Media capabilities are typically described using the session description protocol (SDP). Once respective endpoints are in an active session with each other and have determined each other's capabilities, the specified media content may be exchanged during an appropriate media session.

According to the Internet Engineering Task Force's RFC 3261, a user agent is an application that contains both a user agent client and a user agent server. A user agent client generally refers to a client application that initiates SIP requests, wherein a user agent server is an application that contacts the user when a SIP request is received, and returns a response on behalf of the user. Typically, the response accepts, rejects, or redirects the received request.

FIG. 1 illustrates the CUA 14, which is an application, program, or function that acts on behalf of a multimedia client, provided by the computer 18 or other computing device, and a telephone 22. The computer 18 may have a SIP user agent, which is represented by the CUA 14. In essence, the CUA 14 will function to control call signaling to effect voice sessions between the telephone 22 and other devices via the telephony switch 24, and other multimedia sessions via the computer 18. Notably, the CUA 14 can effectively facilitate the integration of and association of voice and other multimedia sessions provided by both devices. To devices needing to establish sessions with either the computer 18 or the telephone 22 in a SIP environment, the CUA 14 presents both devices as a single device having voice and other multimedia capabilities. The other devices need not know that the telephone 22 resides on a circuit-switched network.

In one embodiment, the CUA 14 will cooperate with the proxy 16, which is configured as a SIP proxy, in traditional fashion to establish multimedia sessions involving the computer 18. The sessions will be supported across the network access 20 in the packet network 12. With respect to voice communications via the telephone 22, the voice path may take various routes, remaining entirely within the public switched telephone network (PSTN), or venturing into the packet network 12 to communicate with a packet-switched telephony device or simply to bridge to another circuit-switched network.

The communication environment 10 illustrated in FIG. 1 illustrates voice communications between the telephone 22 and a voice-capable packet-switched device 30, such as an IP telephone 30A or a computer 30B. The packet-switched devices 30 are connected to the packet network 12 via a local area network (LAN) 32 to support packet-switched communications. Since the telephone 22 and telephony switch 24 facilitate circuit-switched communications, a gateway (GW) 28 is integrated with the telephony switch 24 or provided as a separate device (as shown) to convert circuit-switched communications to packet-switched communications capable of being transported over the packet network 12 to the desired packet-switched device 30. The connection between the telephony switch 24 and the gateway 28 may be any traditional telephony line or trunk. The gateway 28 appears to the telephony switch 24 as another switching device supporting a variety of telephone numbers, which are associated with the packet-switched devices 30. Typically, the time-division multiplexed (TDM) circuit-switched communications are converted into packets to facilitate voice communications over the Internet Protocol (VoIP). Importantly, although the voice session spans the circuit-switched and packet-switched networks, the CUA 14 represents the telephone 22 to the devices with which it communicates. In essence, the telephone 22 and the computer 18 form a combined legacy client 34, which is represented by the CUA 14.

Figure 2:
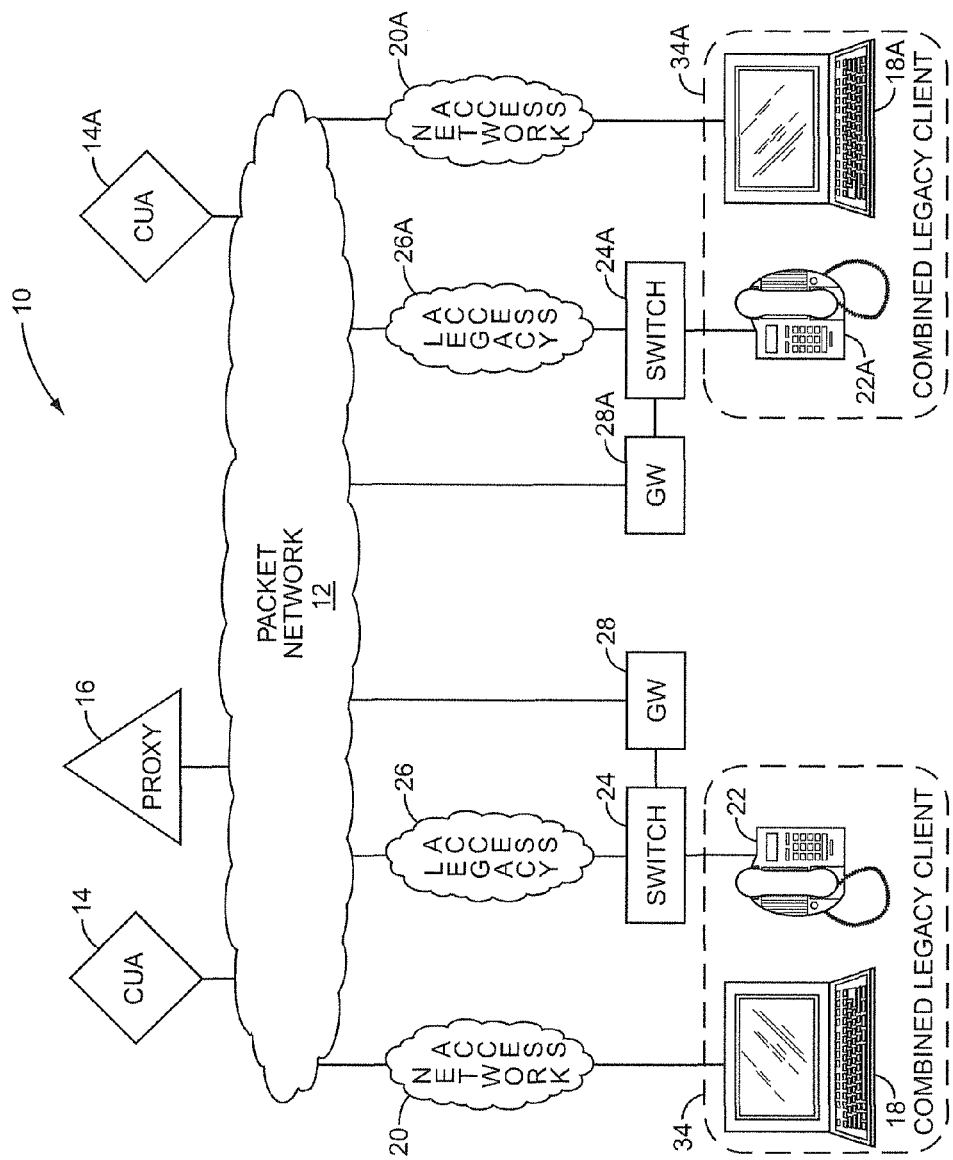
FIG. 2 is a second embodiment of a communication environment adapted to support the present invention.

With reference to FIG. 2, another CUA 14A is provided to support a computer 18A via network access 20A and a circuit-switched telephone 22A, which is supported by telephony switch 24A. The CUA 14A provides call signaling to the telephony switch 24A via legacy access 26A in a similar manner to that described above. Further, the telephony switch 24A is associated with a gateway 28A to convert circuit-switched communications into packet-switched communications for transport over the packet network 12. The communication environment 10 in FIG. 2 illustrates the communication path between telephone 22 and telephone 22A during a voice session being routed over the packet network 12 between the gateways 28 and 28A. Multimedia sessions other than voice sessions between computers 18 and 18A may be established in traditional fashion over the packet network 12. Again, the CUA 14 represents the combined legacy client 34 containing the computer 18 and the telephone 22, whereas the CUA 14A supports the combined legacy client 34A, which is made up of the computer 18A and the telephone 22A. In this embodiment, the CUA 14A is supported by the proxy 16.

Figure 3:
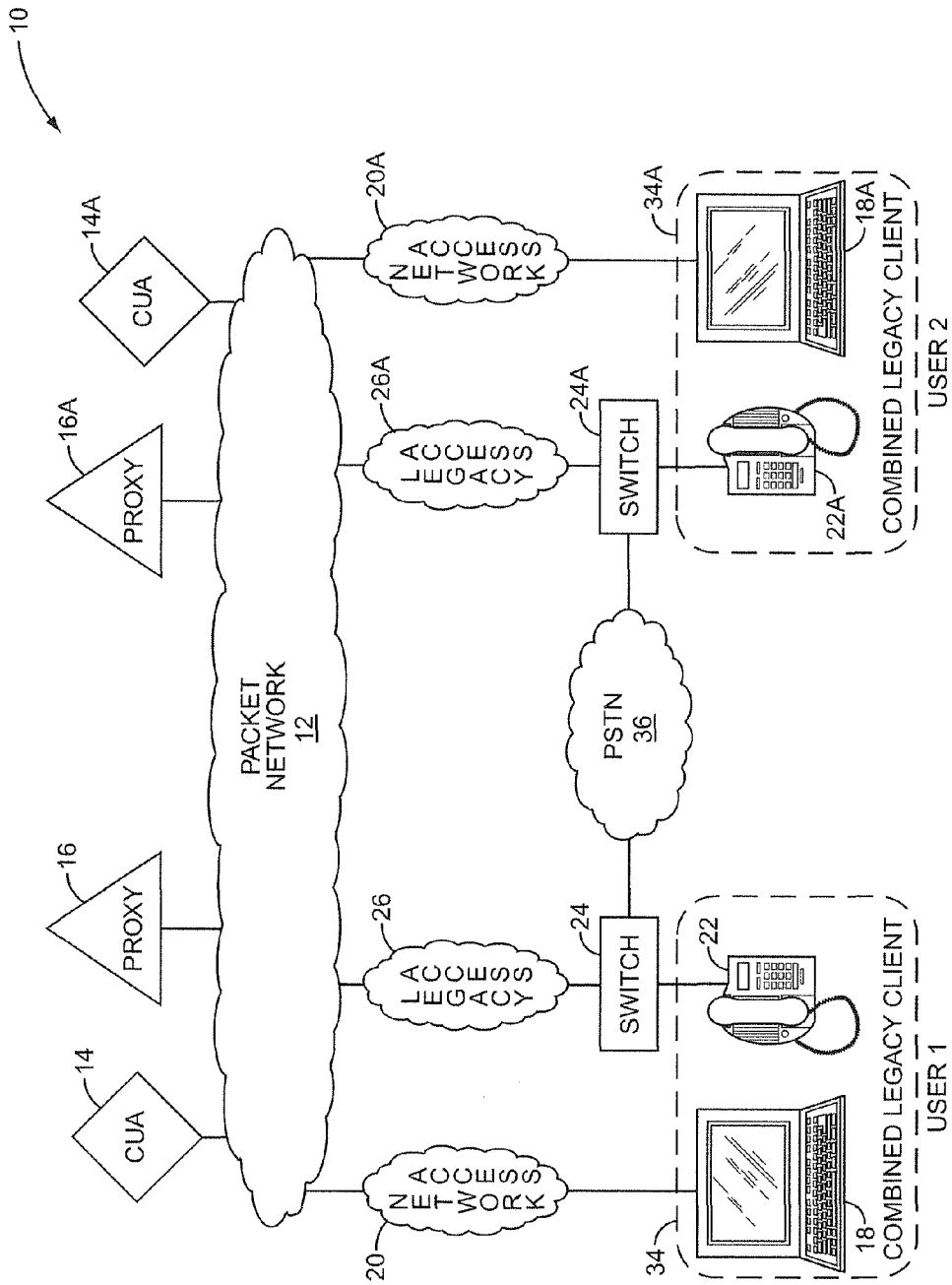
FIG. 3 is an alternate embodiment of the communication environment of FIG. 2.

With reference to FIG. 3, the CUA 14A may be supported by a separate proxy 16A. Further, the communications between telephone 22 and telephone 22A during a voice session may be supported entirely within the PSTN 36. The CUAs 14 and 14A may provide call signaling not only to the respective telephony switches 24 and 24A, but also to other network elements within the PSTN 36 such that they have enough information to establish an end-to-end connection across the PSTN 36. In short, the CUAs 14 and 14A are configured to provide the necessary call signaling to establish voice sessions that are supported at least partially over the circuit-switched network of the PSTN 36, as well as multimedia sessions with the computer 18 over the packet network 12.

Figure 4:
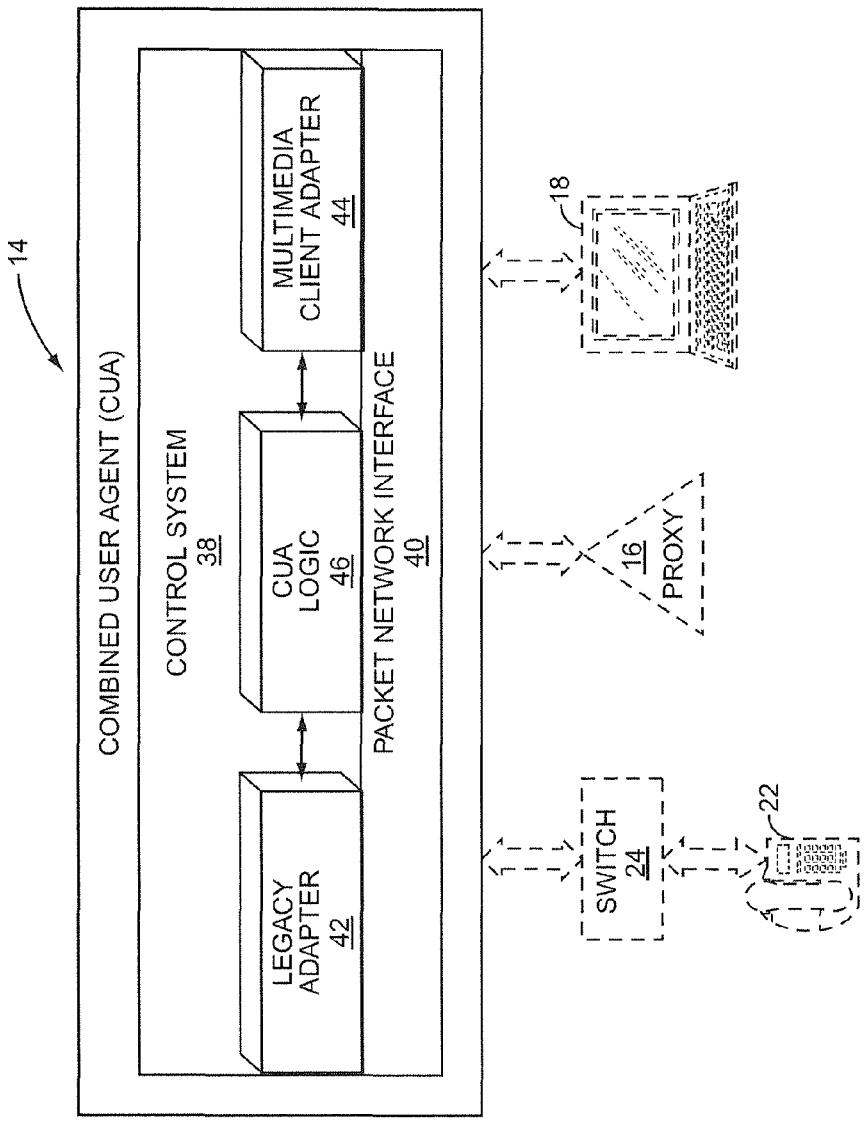
FIG. 4 is a block diagram of a combined user agent according to the present invention.

As illustrated in FIG. 4, the CUA 14 is preferably implemented in a control system 38 associated with a packet network interface 40 for communicating over the packet network 12. The control system 38 will support software applications providing a legacy adapter 42, a multimedia client adapter 44, and the basic CUA logic 46. The legacy adapter 42 will provide the necessary protocol adaptation and call signaling control necessary to control the telephony switch 24 in light of SIP or related protocols for establishing media sessions. The multimedia client adapter 44 is used to support sessions with the associated computer 18 or like multimedia device. The multimedia client adapter 44 may provide protocol adaptation as necessary to establish the media sessions of a SIP implementation, wherein when the computer 18 emulates a SIP client, the CUA logic 46 will simply represent the multimedia capabilities of the computer 18 for the non-voice media sessions. The CUA logic 46 will also cooperate with the legacy adapter 42 to provide the necessary call signaling for the telephony switch 24 to control voice communications with the telephone 22. Accordingly, the CUA logic 46 cooperates with the legacy adapter 42 and the multimedia client adapter 44 to provide an interface to the computer 18 as well as an interface to the telephony switch 24, and an interface for communications with other devices, such as the proxy 16. In an exemplary embodiment, the CUA 14 may be incorporated into the Interactive Multimedia Server sold by Nortel Networks Limited of 2351 Boulevard Alfred-Nobel, St. Laurent, Quebec, Canada, H4S 2A9.

Figure 5:
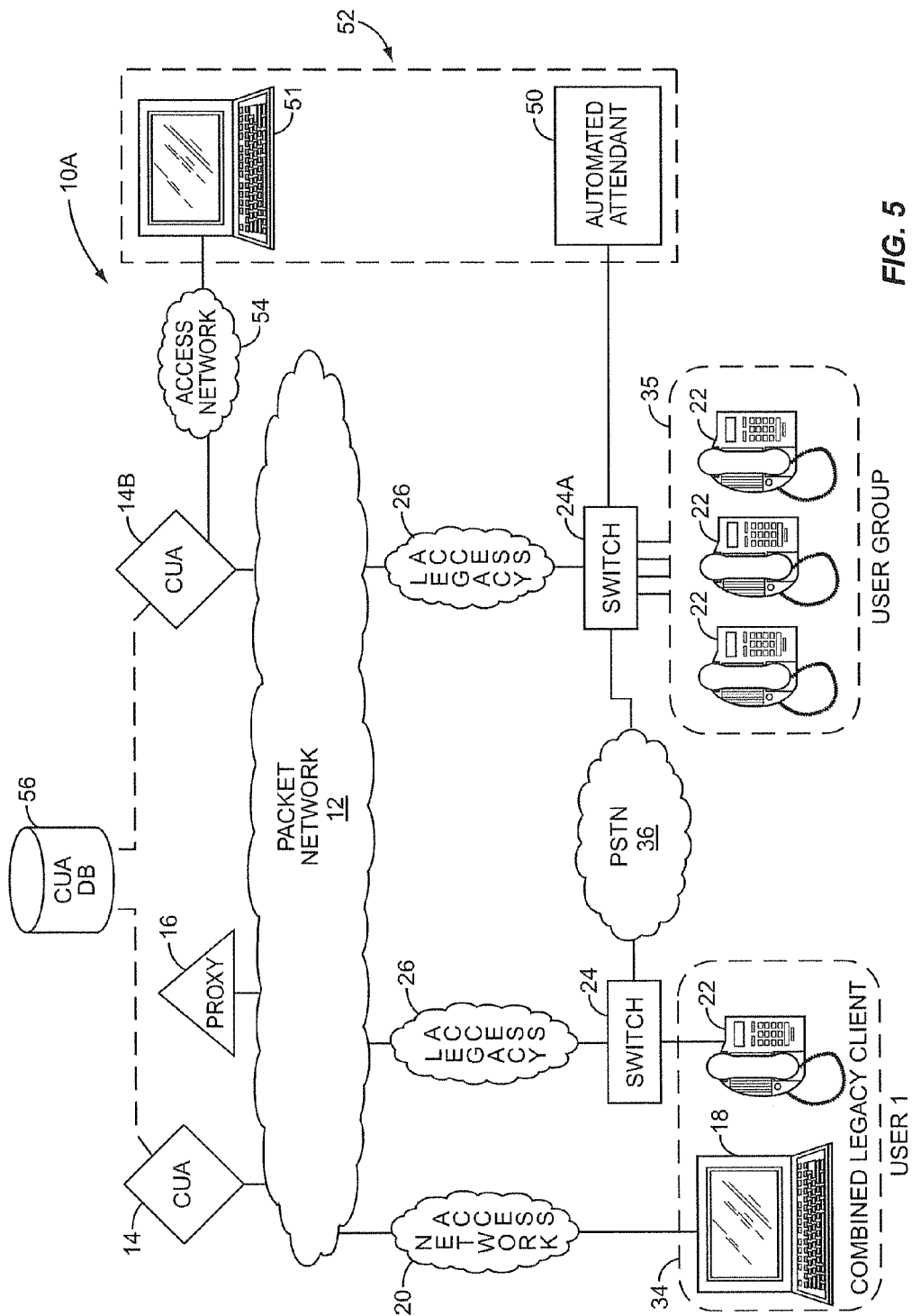
FIG. 5 is a communication environment with a caller and a called entity with multiple potential call termination end points.

Against this backdrop, the present invention is readily implemented. The present invention allows callers that reach automated attendants associated with the called entity to receive multimedia information so as to facilitate selection of a desired connection or option within the automated attendant's options. The communication network 10A in which such a situation may occur is illustrated in FIG. 5. The called entity may be a call center, an enterprise, or other entity with multiple phones 22 that share at least one common PSTN phone number. Collectively, this is represented herein as a user group 35. In prior art implementations, the incoming call can be answered first by a live attendant or operator who then connects the caller to the proper phone 22 within the user group 35. Alternatively, the incoming call can be answered by an automated attendant 50. The automated attendant 50 is representative of any automated response system and may include interactive voice response (IVR) features as needed or desired. Further, the automated attendant 50 may answer any incoming calls to the user group 35 and present the caller with menus and prompts which must be navigated before the caller is connected to the person or information that they seek. For the purposes of the present invention, the final choice is termed an "extension." While normally the term "extension" implies a particular phone number extension, the present usage is not limited strictly to such situations, but also includes other terminations points, like a recorded announcement, a voice mail system or a call center system. The automated attendant 50 can also accept additional in-band dual tone multi-frequency (DTMF) signaling from the caller to signal which specific extension is to be reached. In both cases the automated attendant 50 signals to the switch 24A to which specific phone 22 from user group 35 the caller needs to be connected.

The present invention provides a technique through which the caller is assisted in the navigation through the menus and selections provided by the automated attendant. The automated attendant 50 is augmented with an automated attendant server 51. The combination of the automated attendant server 51 and the automated attendant 50 creates a hybrid automated attendant 52, which is represented on the network 12 by a CUA 14B. The CUA 14B functions like the CUA 14A, previously described. The automated attendant server 51 communicates with the CUA 14B through any appropriate means and protocols over an access network 54. The hybrid automated attendant 52 uses the CUA 14B for managing its combined voice and media sessions. The CUA 14B may be communicatively connected to a CUA database (DB) 56 that stores what CUAs 14 are associated with what phone numbers and/or addresses. Other profile information may also be stored in CUA database 56 as needed or desired.

Figure 6:
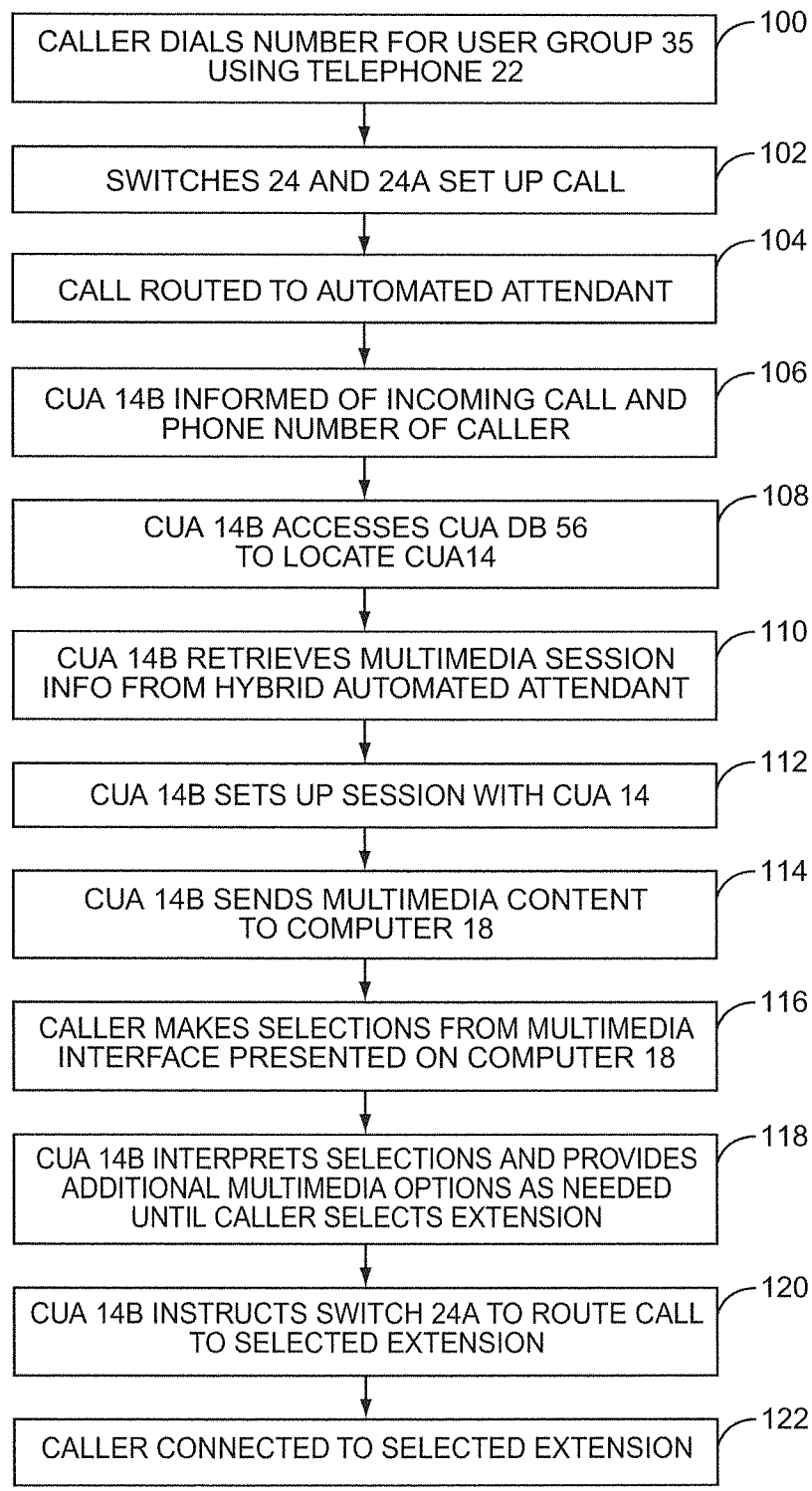
FIG. 6 is a flow chart illustrating the methodology of the present invention.

The methodology of the present invention is illustrated in FIG. 6. Specifically, a caller dials a number for user group 35 using telephone 22 (block 100). While dialing is one embodiment, the caller may provide an address or identifier for the user group 35 through any appropriate means. User group 35 may be an enterprise, call center, or other location with an automated attendant or automated response system. The switches 24 and 24A set up the call (block 102). The call is then routed to the automated attendant 50 (block 104).

In parallel with the call being routed to the automated attendant, the CUA 14B is informed of the incoming call, the phone number of the caller, and any other information as needed or desired (block 106). The CUA 14B accesses the CUA database 56 to locate an address, typically expressed as a uniform resource locator (URL) or a directory number, for the CUA 14 based on the caller's phone number or other identification element (block 108). Although a single CUA database 56 is shown, a number of CUA databases 56 can be involved in the search for the CUA 14 address, using well known techniques outside the scope of this invention. If the caller does not have multimedia capabilities and does not have a CUA 14, then the search of CUA database 56 will not find a valid entry and the call will be treated like a normal call such that it is handled by the audio-only automated attendant 50. The CUA 14B also retrieves multimedia session information from the automated attendant server 52 (block 110). This information may be extension number, directories, menus, and other multimedia content that may be presented to the caller. Note that this step is optional. The information may remain stored with the automated attendant server 52.

The CUA 14B sets up a session with the CUA 14 (block 112). This may be done by the aforedescribed SIP messages. The CUA 14B sends multimedia content to the computer 18 (block 114) or other multimedia capable device through the CUA 14. In the event that the CUA 14B retrieved the information in block 110, then the CUA 14B sends the information, otherwise, the CUA 14B instructs the automated attendant server 52 to send the information to the computer 18. This multimedia content is used to present the caller with menus and selection options corresponding to those normally audibly presented by the automated attendant 50, but instead of the purely audible options, the caller may be presented with multimedia versions of these options and menus on the computer 18. Further, these options may be supplemented with additional information as needed or desired. The caller can make selections from the multimedia interface presented on computer 18 (block 116). Specifically, the caller may be given the option to perform a query of the directory for user group 35. For example, the caller could type in, using the computer 18, the name of the person or department with whom the caller desires contact. The request would be sent to the automated attendant server 52 which would do the search and send back, to the caller via the computer 18, a list of matching entries. The caller would then simply select a desired entry.

The CUA 14B interprets the selections made by the caller and provides additional options and menus as needed until the caller selects an extension or phone number with which the caller desires to be connected (block 118). The CUA 14B instructs the switch 24A to route the call to the selected destination (block 120), and the caller is connected to the selected extension (block 122).

While the process has been described linearly, it is possible that some of the steps may take place concurrently or in a different order and still fall within the scope of the present invention. Likewise, while the multimedia exchange takes place, a concurrent audio exchange with the audio-only automated attendant 50 may be used in parallel, allowing the caller to make choices in a manner most convenient to the caller.

Note further that while the above process has been described with the CUA 14B of the combined user 35 searching the CUA database 56 for the multimedia capabilities of the caller, it is also possible that the caller may pass along an indication of multimedia capabilities with the original call set up. This may be done by using a flag or similar technique. In an exemplary embodiment, the originating switch determines if the calling party is multimedia capable, and if yes, a flag is added to the call processing message sent toward the called party. The terminating switch checks for the flag and passes information concerning the flag to the CUA 14. Other permutations on this can be performed as needed or desired.

Those skilled in the art will recognize improvements and modifications to the preferred embodiments of the present invention. All such improvements and modifications are considered within the scope of the concepts disclosed herein and the claims that follow.

What is claimed is:

1. A method of assisting callers using an automated response system, comprising:
   receiving a SIP message from a caller terminal requesting a communication session;
   determining an IP address and at least one caller terminal capability from the SIP message;
   accessing a combined user agent database using an identifier associated with the caller terminal to determine if the caller terminal can display selectable multimedia call options; and
   transmitting a web page including selectable multimedia call options to the caller terminal when a determination is made that the caller terminal can display selectable multimedia call options.

2. A method as recited in claim 1, further comprising:
   receiving a selection message indicating selection of a multimedia call option at the caller terminal; and
   completing a connection to the caller terminal in response to the selection message.

3. A method as recited in claim 2, wherein the step of completing a connection comprises completing a voice connection to the caller terminal in response to a voice call selection message.

4. A method as recited in claim 1, wherein the steps of receiving a SIP message and determining an IP address and at least one caller terminal capability are performed by at least one combined user agent.

5. A method as recited in claim 1, wherein the step of transmitting a web page comprises transmitting a web page from an automated response system.

6. A system, comprising:
   a combined user agent configured to:
   receive a SIP message from a caller terminal requesting a communication session;
   determine an IP address and at least one caller terminal capability from the SIP message;
   access a combined user agent database using an identifier associated with the caller terminal to determine if the caller terminal can display selectable multimedia call options; and
   transmit a web page comprising selectable multimedia call options to the caller terminal when a determination is made that the caller terminal can display selectable multimedia call options.

7. A system as recited in claim 6, wherein the combined user agent is further operable:
   to receive a selection message indicating selection of a multimedia call option at the caller terminal; and
   to complete a connection to the caller terminal in response to the selection message.

8. A system as recited in claim 7, wherein the combined user agent is operable to complete a voice connection to the caller terminal in response to a voice call selection message.

9. A system as recited in claim 6, wherein the combined user agent is operable to transmit the web page comprising selectable multimedia call options by forwarding a web page received from an automated response system.

10. A system as recited in claim 6, further comprising an automated response system, the automated response system being coupled to the combined user agent and operable to transmit a web page comprising selectable multimedia call options to the combined user agent to be forwarded to the caller terminal.

* * * * *